United States Patent [19]
Göbel et al.

[11] Patent Number: 5,658,617
[45] Date of Patent: Aug. 19, 1997

[54] AQUEOUS DISPERSION OF POLYURETHANE RESINS, A METHOD OF MANUFACTURING THEM, COATING AGENTS CONTAINING THEM AND USE THEREOF

[75] Inventors: Armin Göbel, Hasslinghausen; Hans-Peter Patzschke, Wuppertal, both of Germany

[73] Assignee: Herberts Gesellschaft mit beschrankter Haftung, Wuppertal, Germany

[21] Appl. No.: 595,454

[22] Filed: Feb. 5, 1996

Related U.S. Application Data

[63] Continuation of Ser. No. 274,638, Jul. 13, 1994, abandoned.

[30] Foreign Application Priority Data

Jul. 16, 1993 [DE] Germany .................. 43 23 896.3

[51] Int. Cl.$^6$ .................. B05D 3/02; C08J 3/00; C08K 3/20; C08L 75/00

[52] U.S. Cl. .................. 427/372.2; 427/385.5; 427/388.4; 524/591; 524/839; 524/840; 524/507; 524/539

[58] Field of Search .................. 524/591, 839, 524/840, 507, 539; 427/372.2, 385.5, 388.4

[56] References Cited

U.S. PATENT DOCUMENTS

| | | | |
|---|---|---|---|
| 4,794,147 | 12/1988 | Savino et al. | 525/440 |
| 5,331,039 | 7/1994 | Blum et al. | 524/507 |
| 5,342,882 | 8/1994 | Gobel et al. | 427/385.5 |

*Primary Examiner*—Patrick Niland
*Attorney, Agent, or Firm*—Schweitzer Cornman Gross & Bondell LLP

[57] ABSTRACT

A method of manufacturing aqueous dipsersion of polyurethane resins free from urea groups and containing ionic groups and suitable for coating agents, with a number average moleculear weight (Mn) of 10,000 to 300,000 and an acid number of 5 to 50, by preparing a polyurethane prepolymer containing OH groups and with an OH number of 5 to 75 and a number average molecular weight (Mn) of 5,000 to 50,000.

11 Claims, No Drawings

AQUEOUS DISPERSION OF POLYURETHANE RESINS, A METHOD OF MANUFACTURING THEM, COATING AGENTS CONTAINING THEM AND USE THEREOF

This is a continuing application of U.S. Ser. No. 08/274,638, filed Jul. 13, 1994, now abandoned.

BACKGROUND OF THE INVENTION

The invention relates to aqueous dispersions of polyurethane resins free from urea groups and containing ionic groups and of use as binder dispersions for coating agents. The invention also relates to manufacture of the dispersions and coating agents containing them and use thereof.

The use of binders dilutable after neutralisation in water is very important in the lacquering industry. The literature also contains descriptions of polyurethane dispersions of general use as binders in the lacquering industry. Polyurethane dispersions, particularly in multi-layer lacquer coats, have good properties as binders in primers, base lacquers or covering lacquers. When used as base lacquers, the dispersions are preferably covered wet-on-wet with clear lacquers, after which the layers are simultaneously cross-linked by baking.

Various synthetic methods of producing water-dilutable polyurethane resins are known. One problem in synthesis is to obtain a high molecular weight. This is generally done by preparing pre-adducts which are subjected to a chain-lengthening reaction. According to EP-A-0 089 497, dispersions of water-soluble isocyanate prepolymers are prepared and are lengthened by reacting with diamine chains in the aqueous phase. In DE-A 39 15 459, isocyanate-terminated pre-adducts are produced, and after neutralisation, are converted into the aqueous phase. As a result of the excess of water in the dispersion phase, a chain-lengthening reaction occurs among the dispersed particles. In DE-A-35 45 618, NCO-terminated prepolymers are prepared and converted into the aqueous phase. Water-dispersible polyols are then introduced into the aqueous phase and react with the NCO groups and increase the molecular weight.

It has been found, however, that the chain-lengthening reactions of NCO-terminated reaction products in the aqueous phase are difficult to reproduce, and the same consequently applies to the high molecular weights.

In DE-A-40 01 841, an aqueous dispersion of an amino group-containing prepolymer is prepared. The pre-polymer is reacted with a water-insoluble polyisocyanate in the aqueous phase, resulting in a longer-chain polyurethane polymer. The resulting binders have the disadvantage of an increased content of urea groups, i.e. a hard polymer constituent which impairs the properties of the binder. In DE-A-39 03 804, polyesters containing hydroxyl groups and carboxyl groups are reacted to obtain a polyurethane prepolymer containing OH groups. This prepolymer is reacted in the solvent phase with triisocyanates, resulting in partly cross-linked products, and is then neutralised with amines and converted into the aqueous phase. One disadvantage of the resulting binders is that they are sensitive to hydrolysis, so that the aqueous binder dispersion is difficult to store for a prolonged period.

SUMMARY OF THE INVENTION

The aim of the invention is to provide an aqueous polyurethane binder dispersion which can be manufactured in a reliably reproducible manner and is also resistant to hydrolysis and has good stability in storage.

DETAILED DESCRIPTION OF THE INVENTION

It has been found that this problem can be solved by preparing aqueous dispersions (constituting one subject of the invention) of polyurethane resins containing ionic groups and free from urea groups and with a number average molecular weight (Mn) of 10 000 to 300 000 and an acid number of 5 to 50, obtainable by:

Preparing a polyurethane prepolymer containing OH groups and with an OH number of 5 to 75 and a number average molecular weight (Mn) of 5 000 to 50 000, by reacting the following in an organic medium:

A) One or more compounds which react with isocyanate and have an acid number of 0 to 10, in the form of
  a) 70 to 100 wt. % of one or more polyester diols and/or polyether diols with a molecular weight of 500 to 6 000, together with
  b) 30 to 0 wt. % of one or more compounds different from a) and with at least two groups which react with isocyanate and with a molecular weight of 60 to 400, with One or more substances containing free isocyanate groups and obtained by a reaction between
  c) At least one compound With two groups which react with isocyanate and with at least one anionic or anion-forming group and
  d) One or more organic diisocyanates in a proportion such that the molar ratio of the groups reacting with isocyanate in c) to the isocyanate groups in d) is 1:1.0 to 1:4.0 preferred to 1:3.0 particularly preferred to 1:2.5, the reaction product B) being optionally prepared in the presence of component A), the component B) being used in a proportion such that the final polyurethane resins have the desired acid number, and with c) One or more polyisocyanates with at least two free isocyanate groups per molecule, in a proportion such that the molar ratio of the OH groups in component A) to the NCO groups in components B) and C) is 1.01:1 to 3:1, after which the prepolymer obtained from A), B) and C), before or after partial or complete neutralisation of any groups present which are convertible into ionic groups, is subjected to a chain-lengthening process in the organic medium or after conversion to the aqueous phase, by reaction with D) One or more polyfunctional isocyanates with a functionality of free NCO groups of at least 1.8, in proportions such that the final polyurethane resin has the desired number average molecular weight.

The invention also relates to aqueous coating agents containing the polyurethane dispersions according to the invention together with pigments and/or fillers and optional conventional lacquer additives such as levelling agents, thixotropic agents and wetting agents, one or more organic solvents or optional other cross-linking agents and/or water-dispersible binders which are different from polyurethane dispersions.

The component Aa) used in preparing the aqueous dispersions according to the invention is preferably a straight-chain polyol component with terminal OH groups. The component a) can e.g. be a polyether polyol having the general formula I

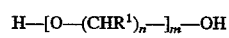  (I)

where $R^1$=hydrogen or a lower alkyl radical (e.g. with 1 to 6 or 1 to 4 C atoms) optionally with one or more substituents, n=2 to 6, preferably 3–4 and m=at least 5, e.g. 5 to 50.

Poly (oxytetramethylene) glycols, poly (oxyethylene) glycols and poly(oxypropylene) glycols are examples.

Preferably use is made of the aforementioned polyester polyols having a molecular weight in the range of 500 to 3 000 and manufactured without use of ethylene oxide, i.e. more particularly with exclusive use of propylene oxide or tetrahydrofuran. The OH number is preferably 40 to 220.

Component a) can also contain hydrophilic polyols with one or more hydrogen atoms capable of reacting with isocyanates and with a side chain containing polyether chains comprising ethylene oxide or mixtures thereof. These improve the dispersion of polyurethanes in the aqueous phase.

Also or additionally, polyester polyols can be used as component a). The polyester polyols can be prepared e.g. by esterifying organic dicarboxylic acids or anhydrides thereof with organic polyols. The dicarboxylic acids and polyols can be aliphatic or aromatic.

The polyols used to produce the polyesters are e.g. diols such as alkylene glycols, e.g. ethylene glycol, butylene glycol, neopentyl glycol or other glycols such as dimethylol cyclohexane. Use can also be made of small quantities of higher-functional OH components or mixtures of higher-functional and mono-functional OH components such as trimethylol propane, pentaerythritol, glycerol, hexanetriol; polyethers which are condensates of glycols with alkylene oxides; or monoethers of the aforementioned glycols, such as diethylene glycol monoethyl ether or tripropylene glycol monomethyl ether.

The acid component of the polyester preferably comprises low-molecular dicarboxylic acids or anhydrides thereof with 2 to 18 carbon atoms in the molecule.

The following are examples of suitable acids: phthalic acid, isophthalic acid, terephthalic acid, tetrahydrophthalic acid, hexahydrophthalic acid, adipic acid, azelaic acid, sebacic acid, fumaric acid, maleic acid, glutaric acid, succinic acid or itaconic acid. These acids can be replaced by their anhydrides, if they exist. Alternatively, branched polyesters can be obtained by adding proportions of trifunctional carboxylic acids such as trimellitic acid, malic acid, aconitic acid, bis-hydroxyethyl taurine or dimethylol propionic acid.

The polyesters preferably have a molecular weight of 400 to 6 000, an OH number of 20 to 280 and an acid number below 3. Straight-chain polyesters are preferably used.

Polyester polyols, preferably diols derived from lactones, can also be used as component a) according to the invention. These products are obtained e.g. by reacting an ε-caprolactone with a diol. Such products are described e.g. in U.S. Pat. No. 3,169,945.

The polylactone polyols obtained by this reaction are characterised by the presence of a terminal hydroxyl group and by recurring polyester components derived from lactone. These recurring molecular components can correspond to the formula:

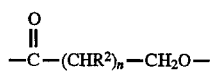  (II)

in which n is preferably 4 to 6 and the substituent $R^2$ is hydrogen, an alkyl radical, a cycloalkyl radical or an alkoxy radical, no substituent contains more than 12 carbon atoms, and the total number of carbon atoms in the substituent in the lactone ring does not exceed 12.

The lactone used as starting material can be any lactone or combination of lactones, the lactone containing at least 6 carbon atoms in the ring, e.g. 6 to 8 carbon atoms, and at least two hydrogen substituents being present on the carbon atom bonded to the oxygen group in the ring. The lactone used as starting material can be represented by the following general formula (III):

 (III)

in which n and $R^2$ have the meaning given previously.

The lactones for preparing the polyester diols according to the invention are preferably epsilon caprolactones in which n is equal to 4. The most-used lactone is the unsubstituted epsilon caprolactone in which n has the value 4 and all $R^2$ substituents are hydrogen. This lactone is preferably used, since it is available in large quantities and provides coatings with excellent properties. Various other lactones can be used individually or in combination.

Examples of aliphatic diols suitable for reaction with lactone include ethylene glycol, 1,3-propanediol, 1,4-butanediol and dimethylol cyclohexane.

Polycarbonate diols can also be used as a). These are carbonic acid esters obtained by reacting carbonic derivatives such as diphenyl carbonate or phosgene with diols. The diols can e.g. be ethylene glycol, propanediol-1,2 or -1,3, butanediol-1,4 or -1,3, hexanediol-1,6, octanediol-1,8, neopentyl glycol, 1,4-bis-hydroxymethyl cyclohexane, 2-methyl-1,3-propanediol, 2,2,4-trimethyl pentanediol-1,3, diethylene glycol, polypropylene glycol, dibutylene glycol, polybutylene glycols, bisphenol A or tetrabromobisphenol.

Examples of suitable polycarbonate diols are described in EP-A-0 427 979. Use can also be made of sequenced polydiols from polyethers and polyesters or polycarbonates.

Diols a) are substantially free from carboxyl groups,. i.e. only small proportions of unreacted COOH groups are present. The acid number is preferably below 10 mg usually below 5. These small proportions of optionally ionic groups make no contribution towards stabilising the aqueous dispersions.

Mixtures of different diols a) can also be used.

The optionally also-used low-molecular compounds Ab) are low-molecular alcohols. These are compounds having a molecular weight below 400, known per se in polyurethane chemistry and containing hydroxyl groups which are at least difunctional with regard to an isocyanate addition reaction. The compounds can be difunctional with regard to the isocyanate addition reaction or can be at least trifunctional or can be any mixtures of such compounds. It is particularly preferred to use diols in the reaction. The following are examples of such components: low-molecular polyhydric alcohols such as ethylene glycol, propanediol-1,2 or -1,3, butanediol-1,4 or 1,3, hexanediol-1,6, octanediol-1,8, neopentyl glycol, 1,4-bishydroxymethyl cyclohexane, 2-methyl-1,3-propanediol, 2,2,4-trimethyl pentanediol-1,3, glycerol, trimethylol propane, trimethylol ethane, isomeric hexanetriols or pentaerythritol or mixtures thereof. These polyol compounds more particularly have a molecular weight below 400.

The proportion of low-molecular compounds b) can be up to 30 wt. % relative to a). The degree of cross-linking can be controlled by varying the proportion of higher-functional polyols. Care must be taken, however, that no cross-linking occurs.

The component B) used according to the invention comprises NCO-terminated compounds obtained by reacting aliphatic, cycloaliphatic or aromatic diisocyanates d) with compounds c) containing two groups which react with isocyanate groups and containing at least one group which is anionic or capable of forming anions. The compounds are mainly low-molecular. The molar ratio of the non-ionic reactive group to the isocyanate group is 1:1.0 to 1:4.0, e.g. from 1:1.5 to 1:2.5. Preferably the ratio is about 1:2. Care must be taken to react the reactive group with the isocyanates. These compounds also dissolve easily in organic solvents. The reaction preferably occurs in liquid form, i.e. proportions of organic non-reactive solvents can also be present. Optionally the temperature can be somewhat raised to improve the reaction.

Component B) can be added separately, or alternatively B) can be produced in situ in the presence of A) from the mixture, and the reaction can continue. It is also possible to simultaneously react the components A, Bc), Bd) and C).

Non-ionic groups such as hydroxyl groups, thiol groups and primary and secondary amino groups are particularly suitable for reacting with isocyanate groups. The following are examples of low-reactive acid groups capable of forming anions: carboxylic acid, phosphonic acid and sulphonic acid groups. Dihydroxy acids or diamino acids propane, trimethylol ethane, isomeric hexanetriols or pentaerythritol or mixtures thereof. These polyol compounds more particularly have a molecular weight below 400.

The proportion of low-molecular compounds b) can be up to 30 wt. % relative to a). The degree of cross-linking can be controlled by varying the proportion of higher-functional polyols. Care must be taken, however, that no cross-linking occurs.

The component B) used according to the invention comprises NCO-terminated compounds obtained by reacting aliphatic, cycloaliphatic or aromatic diisocyanates d) with compounds c) containing two groups which react with isocyanate groups and containing at least one group which is anionic or capable of forming anions. The compounds are mainly low-molecular. The molar ratio of the non-ionic reactive group to the isocyanate group is 1:1.5 to 1:2.5. Preferably the ratio is about 1:2. Care must be taken to react the reactive group with the isocyanates. These compounds also dissolve easily in organic solvents. The reaction preferably occurs in liquid form, i.e. proportions of organic non-reactive solvents can also be present. Optionally the temperature can be somewhat raised to improve the reaction.

Component B) can be added separately, or alternatively B) can be produced in situ in the presence of A) from the mixture, and the reaction can continue. It is also possible to simultaneously react the components A, Bc), Bd) and C).

Non-ionic groups such as hydroxyl groups, thiol groups and primary and secondary amino groups are particularly suitable for reacting with isocyanate groups. The following are examples of low-reactive acid groups capable of forming artions: carboxylic acid, phosphonic acid and sulphonic acid groups. Dihydroxy acids or diamino acids are examples of compounds containing at least two groups which react with isocyanates and at least one group capable of forming anions. The following are examples of suitable dihydroxy acids: dihydroxycarboxylic acids such as dihydroxypropionic acid, dimethylol propionic acid, dimethylol acetic acid, dimethylol butyric acid, dihydroxysuccinic acid or dihydroxybenzoic acid. Polyhydroxy acids obtainable by oxidation of monosaccharides, e.g. gluconic acid, saccharic acid, mucic acid, glucuronic acid or the like are also suitable. The amino group-containing compounds can e.g. be diamino carboxytic acids such as alpha, delta-diamino valeric acid, 3,4-diaminobenzoic acid, 2,4-diaminotoluene sulphonic acid-(5) or 4,4-diamino diphenyl ether sulphonic acid. The compounds containing phosphoric acid groups can e.g. be 2,2-dimethylol propane phosphonic acid or diethanol amide methane phosphonic acid. Dihydroxycarboxylic acids are preferred for preparing an anionic urethane prepolymer, and use of dimethylol propionic acid is particularly preferred.

The component d) used in the reaction can comprise any organic diisocyanates or mixtures thereof, e.g. aliphatic or aromatic or sterically hindered isocyanates or oligomerised isocyanates. The following are examples of suitable diisocyanates: trimethylene diisocyanate, tetramethylene diisocyanate, pentamethylene diisocyanate, hexamethylene diisocyanate, propylene diisocyanate, ethylene diisocyanate, 2,3-dimethyl ethylene diisocyanate, 1-methyl trimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 1-isocyanatomethyl-5-isocyanato-1,3,3-trimethyl cyclohexane, bis-(4-isocyanatocyclohexyl) methane, bis-(4-isocyanato-phenyl)methane, 4,4-diisocyanato-diphenyl ether, 1,5-dibutyl pentamethylene diisocyanate, tetramethyl xylylene diisocyanate or 2,3-bis-(8-isocyanato-octyl)-4-octyl-5-hexyl cyclohexane.

The amount of reaction product B) added to the mixture is sufficient for the resulting polyester urethane to have an acid number of 5–50, preferably between 15 and 40. Phosphonic acid and sulphonic acid are used in suitable quantities.

Component B) is used in the present case in a proportion of e.g. about 0.5 to about 0.7 wt. %, preferably about 0.8 to 4.0 wt. % (calculated as a carboxyl group) relative to the required urethane pre-polymer. If the amount of carboxyl groups is below about 0.5%, it is difficult to obtain a stable emulsion. If on the other hand the amount exceeds 7 wt. %, the hyarophilic properties increase, making the emulsion highly viscous and reducing the resistance of the coating to water.

The aqueous dispersion is stabilised by ionic groups. Alternatively ionic and non-ionic groups can be used together. Stabilisation by anionic groups alone is preferred.

The component C) for producing polyurethane dispersions can be any organic diisocyanates, optionally in a mixture. The diisocyanates can e.g. be those mentioned in d), or oligomeric isocyanates. It is particularly preferable to use non-yellowing or sterically hihdered isocyanates with to 25, preferably 6 to 16 C atoms containing 1 or 2 straight-chain, branched or cyclic alkyl groups with 1 to 12, preferably 1 to 4 C atoms in the alpha position relative to the NCO group. The basic skeleton can e.g. consist of an aromatic or alicyclic ring or an aliphatic straight-chain or branched C chain with 1 to 12 carbon atoms. The following are examples: isophorone diisocyanate, 4,4'-diphenyl propane diisocyanate, xylylene diisocyanate, 1,1,6,6-tetramethyl hexamethylene diisocyanate, p- and m-tetramethyl xylylene diisocyanate and the corresponding hydrogenated homologues.

Alternative substances for use in the reaction are polyisocyanates in which the proportion of isocyanate groups exceeding 2 has been irreversibly defunctionalised. Defunctionalisation can be brought about e.g. by compounds such as low-molecular, primary or secondary amines or alcohols.

The proportions of A), B) and C) or a), b), c) and d) are chosen so that the reaction yields a product with terminal OH groups, i.e. an excess of polyol is used. An OH to NCO ratio of 1.01 to 3:1 can be used, preferably 1.05 to 2:2, particularly preferably 1.1 to 1.5:1. The product of the reaction can be branched, but is preferably straight-chain.

The reaction products have a number average molecular weight (Mn) of 5 000–50 000, preferably over 8 000 and below 30 000, and an OH number of 5–75, preferably over 10 and below 50. The reaction can be performed in a mixture of all the components, or can be brought about stepwise.

The reaction can be brought about without solvents or in solvents suitable for polyurethane synthesis and familiar to the person skilled in the art. The solvents can be left in the batch or distilled off, optionally in vacuo, before further processing. Other solvents can be added, to reduce the viscosity of the polymer solution.

The solvents can be substances which do not cause trouble during the reaction of the isocyanates, e.g. aromatic hydrocarbons such as benzene, toluene, xylene, or esters such as ethyl acetate, butyl acetate, methyl glycol acetate, ethyl glycol acetate, methoxypropyl acetate, or ethers such as tetrahydrofuran, dioxan, completely etherified monoglycols or diglycols of ethylene glycol or propylene glycol such as diethylene glycol or dipropylene glycol dimethyl ether, or ketones such as acetone, methyl ethyl ketone, or halogen-containing solvents such as methylene chloride or trichloromonofluoroethane. Solvents facilitating dispersion in the aqueous phase are preferred, also solvents which do not have any adverse properties subsequently in the coating agents according to the invention.

The intermediate product, i.e. the OH-functionalised polyurethane prepolymers, have their chain lengthened by reaction with additional polyisocyanates D). e.g. homogeneously mixed with the functionalised intermediate product and then reacted optionally by heating or in catalysts conventional in NCO chemistry, Such dibutyl tin dilaurate (DBTL) or amine derivatives. This can happen before or after salt formation of the groups convertible into anionic groups in the organic or aqueous phase. Preferably the reaction occurs after neutralisation in the organic phase.

The polyisocyanates can e.g. be known conventional lacquer poly- or diisocyanates, as already described in the case of components d) and c). They can be aliphatic, cyclo-aliphatic or aromatic-based. They preferably have a molecular weight of below 1200.

The polyisocyanates E) can likewise be low-molecular NCO-terminated prepolymers. These are preferably difunctional. Their molecular weight is preferably below 1 000.

Before or after the chain-lengthening, the groups convertible into anionic groups are neutralised, using bases such as ammonia or amine. The following amines are suitable: primary, secondary or tertiary amines, e.g. trialkyl amines such as trimethyl amine, triethyl amine, triisopropyl amine, tri-n-propyl amine or tri-n-butyl amine; n-alkyl morpholines such as N-methyl morpholine or N-ethyl morpholine; N-dialkyl alkanol amines such as N-dimethyl ethanolamine or N-diethyl ethanolamine; dialkyl amines such asdiethyl amine, dibutyl amine or diisopropyl amine; alkyl amines such as octyl amine, hexyl amine, isopropyl amine or amino ethanol, or mixtures of at least two of these compounds. Usually between 30% and 100% of the acid groups are converted into salt groups.

The aqueous dispersion can be prepared by known methods. For example, the neutralised resins can be supplied first and water can be added with thorough dispersion. Alternatively the water phase, optionally containing neutralisation agents, can be supplied first, and the binder is incorporated by agitation. Another alternative is continuous operation, i.e. the resin, water and neutralisation agents are simultaneously and homogeneously mixed in known units such as a rotor-stator mixer. Conversion into the aqueous phase can be assisted by elevated temperature.

The pH of the resulting polyurethane dispersion is monitored and if necessary adjusted e.g. to between 6 and 8. The components are converted into a finely-divided aqueous polyurethane dispersion.

The polyurethane dispersion according to the invention has an acid number of 5 to 50 (relative to the solids), preferably 15 to 35. The solids make up e.g. 25 to 55 wt. %. The Mn of the binders is 10 000 to 300 000, particularly 50 000 to 200 000. Optionally they can contain other functional groups such as OH groups. The resulting dispersions have an average particle size of e.g. between 10–1000 nm, preferably 30–500.

The polyurethane dispersions according to the invention are stable in storage and do not show any hydrolysis. Even after application and cross-linking, they are highly resistant to water. Binder films made therefrom have only slight hydrophilic properties. They cause only a small proportion of side-reactions during the process.

The polyurethane dispersions according to the invention can be used to produce aqueous low-solvent base lacquer coating agents. To this end pigments, additives and optional other binders or small quantities of solvent are added to the dispersion.

The additional binder components in the coating agents can be water-dilutable polyester resins and/or water-dilutable polyacrylic resins and/or acrylated polyester resins or other reactive or non-functional polyurethane dispersions, optionally together with cross-linking agent's in the form of melamine resins and/or blocked polyisocyanates. The total proportion of additional binders can e.g. be 30 to 80 wt. % relative to the solids in the total binder mixture, the cross-linking agent making up to 20% of the weight.

Water-dilutable polyesters are e.g. substances with free carboxyl groups, i.e. polyesters with a high acid number. The substances in question are conventional known polyesters based on polyols and polycarboxylic acids and also containing free carboxyl groups. They are produced either by breaking off the cross-linking reaction or by incorporating hydroxycarboxylic acids or by forming partial esters of polycarboxylic acids.

The water-dilutable polyacrylate resins, like the aforementioned polyester resins, can contain free carboxyl groups. The substances in question are usually hydroxyl-containing acrylic or methacrylic copolymers, in which the carboxyl groups originate from the acrylic or methacrylic acid content.

The additional polyurethane dispersions can e.g. be those described in DE-A-36 28 125, i.e. anionically stabilised polyurethane dispersions obtained by reacting polyols, diisocyanates and ionic compounds and by lengthening the chain with amines. Polyurethane dispersions stabilised by hydrophilic groups can also be added to the coating agents according to the invention.

Another group of usable aqueous dispersions are those described in DE-A-36 28 124 and based on ionic epoxy group-containing polycondensates reacted with copolymerisable unsaturated monomers.

Usable acrylated polyesters are described e.g. in DE-A-29 11 913 or DE-A-35 44 337. These substances are reaction products of radically polymerised alpha, beta-unsaturated monomers in the presence of straight-chain or branched carboxyl-functional polyesters, which optionally also contain urethane, amide, hydroxyl or epoxy groups.

The amine resins suitable as cross-linking agents include e.g. alkylated condensates obtained by reacting amino triazines and amido triazines with aldehydes. Amines or compounds bearing amino groups such as melamine, guanamine, acetoguanamine, benzoguanamine, dicyanodiamide or urea are condensed by known industrial methods with aldehydes, particularly formaldehyde, in the presence of alcohols such as methanol, ethanol, propanol, butanol or hexanol. Examples of such resins and manufacture thereof are described in "Houben-Weyl, Methoden der organischen Chemie", 1963, page 357. These products are commercially available.

The cross-linking agents can also be blocked polyisocyanates. Use according to the invention can be made of any polyisocyanates in which the isocyanate groups are used together with a volatile monofunctional compound which reacts with isocyanates. Any organic polyisocyanates suitable for cross-linking can be used in the manufacture of blocked polyisocyanates. Preference is given to isocyanates containing 3 to 36, preferably 8 to 15 carbon atoms. The aforementioned diisocyanates C) are examples of suitable diisocyanates.

Use can also be made of polyisocyanates having higher isocyanate functionality, e.g. tris-(4-isocyanatophenyl)-methane, 1,3,5-triisocyanatobenzene, 2,4,6-triisocyanatotoluene, 1,3,5-tris-(6-isocyanato-hexyl)biuret, bis-(2,5-diisocyanato-4-methyl-phenyl)methane or polymeric polyisocyanate such as dimers and trimers of diisocyanatotoluene. Mixtures of polyisocyanates can also be used.

The organic polyisocyanates of use as cross-linking agents in the coating agents according to the invention can also be prepolymers derived e.g. from a polyol including a polyether polyol or a polyester polyol. To this end, polyols are reacted with an excess of polyisocyanates, so as to obtain prepolymers with terminal isocyanate groups.

The polyisocyanates can be blocked by any conventional separable blocking agents such as aliphatic, cycloaliphatic or aromatic alkyl monoalcohols or oximes such as methyl ethyl ketone oxime, acetone oxime or cyclohexanone oxime, or caprolactams, malonic esters, acetoacetic esters, phenols, hydroxamic acid esters and pyrazoles. Glycols, oximes, lactams or mixtures thereof are preferred as blocking agents. To improve the emulsification, some of the blocking agents can consist of potyalkylene monoethers, more particularly polyethylene monoalkyl ethers.

The coating agent can also contain industrial lacquer additives, e.g. substances for influencing the flow properties such as highly-dispersed silicic acid, stratified silicates or polymeric urea compounds. The thickeners can also be water-soluble cellulose ethers or synthetic polymers with ionic groups or groups operating in association such as polyvinyl alcohol, poly(meth) acrylic amide or polyvinyl pyrrolidone or hydrophobically-modified ethoxylated urethanes or polyacrylates. Use can also be made of antideposition agents, levelling agents, light shields, antifoaming agents such as silicone-containing compounds, wetting agents or primers. The term "wetting agents" also denotes known paste resins described e.g. in DE-A-40 00 889 and of use for improved dispersion and trituration of the pigments. The setting process can be accelerated by catalysts, or can be brought about by thermal energy without use of a catalyst.

Use can be made of small proportions of conventional solvents in the lacquer industry, which can originate from anufacture of the binders or can be added separately. The following are examples of such solvents: monohydric or polyhydric alcohols, e.g. propanol, butanol or hexanol, glycolic ethers or esters, e.g. diethylene glycol dimethyl ether, ethoxypropanol or butyl glycol; glycols, e.g. ethylene glycol; N-methyl pyrrolidone or ketones such as methyl ethyl ketone, acetone or cyclohexanone, or aromatic or aliphatic hydrocarbons such as toluene, xylene or C6–C12 straight-chain or branched aliphatic hydrocarbons.

The pigments used are conventional inorganic and organic coloured pigments and/or decorative pigments such as metallic or nacreous pigments. The proportion is between 0.5 and 15 wt. % relative to the coating agent. The metal powders can also be added together with one or more non-metallic pigments or dyestuffs, such as micro-titanium dioxide.

Known organic or inorganic colour pigments can also be added, e.g. vat dies, quinacridones, perylene or phthalocyanines. The inorganic pigments can e.g. be carbon black, titanium dioxide or iron oxide pigments, or transparent pigments such as micronised titanium dioxide, micronised barium sulphate or silicon dioxide. Optionally fillers such as kaolin, mica, chalk, barium sulphate, silicic acids or quartz meal can be added. These coloured pigments are preferably used to make single-colour base lacquers.

The methods of preparing the coating agent according to the invention are known. For example, the pigments and/or fillers can be dispersed and ground in a part of the binder dispersion or the wetting agents. After grinding, the other lacquer components can be added, e.g. other polyurethane dispersions, additional binders, cross-linking agents, substances influencing the flow properties, defoaming agents, anti-cratering agents, levelling agents, catalysts or solvents. Optionally the content of solids and the pH of the coating agent are adjusted.

The binders can be used to prepare aqueous coating agents, e.g. for metallic base lacquers, fillers, anti-gravel layers or single-colour covering lacquers. The pigments, additives and other binders are adapted to the particular purpose. The binders are particularly suitable for producing aqueous base lacquers.

The coating agents prepared from the polyurethane dispersions according to the invention can dry under natural conditions, e.g. in base lacquers or can be chemically cross-linking in the form of single-component material, e.g. in primers. The coating agents are applied by known methods such as spraying, after which the films are dried or cross-linked, optionally assisted by elevated temperatures up to 150° C.

Single-layer or multi-layer lacquer coats can be applied. Preferably the coating is with aqueous clear lacquers, or clear powder lacquers when water-based lacquer is used.

The substrates can be metal or plastics. The substrates known in the car industry, e.g. iron, aluminium, magnesium or alloys thereof, or polyurethanes, polycarbonates or polyolefins are particularly suitable. They can optionally be coated with primers and/or layers of other coating agents.

The invention will now be explained in detail with reference to examples.

EXAMPLE 1

582 g of a commercial polyester (Mn=1 000, OH number=106), 28.7 g dimethylol propionic acid (DMPA) and 124 g of N-methyl pyrrolidone (NMP) were mixed and dissolved at 80° C. The mixture was then cooled to 50° C. 139 g of isophorone diisocyanate (IPDI) was added, with heating to 80° C., and 125 g of NMP was added. The mixture was reacted until the NCO value was below 0.1%.

33.2 g of dimethyl isopropanol amine solution (50% in water) was added to the product of the reaction at 80° C. and agitated for 10 minutes. 1174 g of completely demineralised water was slowly added at 80° C. and thoroughly mixed. The temperature can drop to 50° C. 34.5 g of IPDI was added at 50° C. within 10 minutes to the resulting aqueous dispersion, which was then heated to 80° C.

The result was a finely-divided aqueous dispersion stable in storage.

FK: 36.7% (determined after 30 min., 150° C. circulation-air oven)

SZ: 17.4 mg KOH/g (solids)

MEQ-amine: 18.4 (milli-equivalents per 100 g solids).

FK=weight of solids; SZ=acid number; MEQ=milli-equivalent

EXAMPLE 2

582 g of a commercial polyester (Mn=1 000, OH number=106), 28.7 g dimethylol propionic acid and 124 g NMP were mixed and dissolved at 80° C., then cooled to 50° C. 139 g of IPDI was added to the mixture, with heating to 80° C., and 125 g of NMP was added. The mixture was reacted until the NCO value was below 0.1%.

34.5 g of IPDI was added to the product of the reaction at 50° C. and reacted until the NCO value was below 0.1% at 80° C. Next, 33.2 g of dimethyl isopropanol amine solution (50%) was added and mixed. 1174 g of completely demineralised water was then slowly added at 80° C. with thorough agitation. The mixture was homogenised for 3 hours.

FK: 36.3%

SZ: 16.7 mg KOH/g

MEQ-amine: 19.0.

EXAMPLE 3

219 g of a commercial polyester (Mh=1955, OH number=57.4) and 282 g of a polyester (Mn=5 000, OH number=22.4), 22.4 g DMPA and 195 g NMP were mixed and melted at 80° C. and agitated to obtain a homogeneous solution. After cooling to 50° C., 59.6 g of IPDI was added and reacted at 80° C. until the NCO value was below 0.1%. After cooling to 50° C., 0.6 g dibutyl tin dilaurate (DBTL) and 14.9 g IPDI were added and reacted at 80° C. until the NCO value was below 0.1%.

25.5 g dimethyl isopropanol amine solution (50%) was added at the same temperature and agitated for 10 minutes until homogeneous. Next, the mixture was diluted with 915 g of completely demineralised water at 80° C. with thorough agitation.

The result was a homogeneous stable dispersion.

FK: 35.8%

SZ: 18.2 mg KOH/g solids

MEQ-amine: 19.7.

EXAMPLE 4

582 g of a commercial polyester as per Example 1, 28.7 g DMPA, and 125 g acetone were mixed and dissolved at 55° C. 139 g of IPDI was dissolved in the mixture and 125 g acetone was added at 55° C. and reacted at 65° C. until the NCO value was below 0.1%. 0.8 g of DBTL and 38 g IPDI were added to the mixture at 50° C. and additionally reacted at 65° C. until the NCO value was below 0.1%.

After cooling to 50° C., 35.5 g of an aqueous solution of dimethyl isopropanol amine (50%) was added, after which 1426 g of completely demineralised water at 50° C. was added in 10 minutes with thorough dilation. The acetone was then distilled off at 90° C. Optionally a slight negative pressure can be applied.

FK: 37.4%

SZ: 17.1 mg KOH/g

MEQ-amine: 19.2.

EXAMPLE 5

1863 g of a commercial polyester as per Example 1, 91.8 g DMPA and 400 g acetone were mixed and dissolved at 65° C. 444 g of IPDI was dissolved in the mixture and 400 g acetone was added at 50° C. and reacted at 65° C. until the NCO value was below 0.1%. 2.5 g DBTL and 110 g IPDI were added to the mixture at 50° C. and additionally reacted at 65° C. until the NCO value was below 0.1%.

After cooling to 50° C., 142 g of an aqueous solution of dimethyl isopropanol amine (50%) was added, followed by 4520 g of completely demineralised water at 50° C., added during 10 minutes with thorough agitation. The acetone was then distilled off at 90° C. Optionally a slight negative pressure can be applied.

FK : 31.9%

SZ : 17.5 mg KOH/g

MEQ-amine: 25.3.

EXAMPLE 6

1267 g of a commercial polyester (Mn=1955, OH number=57.4), 1632 g polyester (Mn=5 000, OH number=22.4), 130 g DMPA and 1125 g NMP were mixed and dissolved at 65° C. The mixture was then cooled to 50° C. 345 g of IPDI was added to the mixture, heated to 65° C. and reacted until the NCO value was below 0.1%.

86 g of IPDI mixed with 3.5 g dibutyl tin dilaurate (DBTL) was added to the product of the reaction at 50° C. and reacted at 65° C. until the NCO value was below 0.1%. 180 g of dimethyl isopropanol amine solution (50%) was added and mixed. Next, 6495 g of completely demineralised water was added slowly at 80° C. with thorough agitation. The mixture was homogenised for 3 hours.

FK: 35.2%

SZ: 18.8 mg KOH/g

MEQ-amine: 25.1.

EXAMPLE 7

485 g of a commercial polyester as per Example 1, 25 g DMPA, 2.1 g trimethylol propane and 105 g NMP were mixed and dissolved at 80° C. 118 g IPDI mixed with 65 g NMP were added at 50° C. and reacted at 80° C. until the NCO value was below 0.1%.

400 g acetone mixed with 117 g of a trifunctional isophorone isocyanurate was reacted with 33 mol % caprolactam and reacted at 80° C. until the NCO value was about 0.2%. After cooling to 50%, 30.5 g of dimethyl isopropanol amine solution was added and 1470 g of completely demineralised water was added at the same temperature in 10 minutes with thorough agitation. The acetone was distilled off at 90° C., optionally with application of negative pressure.

FK: 35.6%

SZ: 17.7 mg KOH/g

MEQ-amine: 19.7.

EXAMPLE 8

415 g of a commercial polyester as per Example 1, 24 g DMPA, 1.8 g trimethylol propane, 93 g NMP and 43.5 g of a urethane diol prepared from 1 mol trimethylol propane and 1 mol of a half-side caprolactam masked IPDI were mixed and dissolved at 80° C. 93.5 g IPDI mixed with 89 g NMP were added at 50° C., and 106 g of trifunctional isophorone isocyanate were reacted with 33 mol % caprolactam and reacted at 80° C. until the NCO value was below 0.1% and then cooled to 50° C.

433 g acetone, 29 g IPDI and 0.6 g DBTL were added in succession and reacted at 70° C. until the NCO value was about 0.2%.

After cooling to 50° C., 29.5 g dimethyl isopropanol amine solution (50%) were added and 960 g completely demineralised water was added at the same temperature in 10 minutes with thorough agitation. The acetone was distilled off at 90° C., optionally with application of negative pressure.

FK : 40.7%

SZ: 16.7 mg KOH/g

MEQ-amine: 21.

EXAMPLE 9

464 g of a commercial polyester from Example 1, 25.4 g DMPA, 111 g NMP and 59 g urethane diol were mixed and dissolved at 80° C. The mixture was then cooled to 50° C. 129 g of isophorone diisocyanate was added to the mixture, heated to 80° C. and 111 g NMP were added. The mixture was reacted until the NCO value was about 0.2.

32.5 g IPDI and 0.7 g DBTL were added to the reaction product at 50° C. and reacted until the NCO value was below 0.1% at 80° C. Next, 27 g of dimethyl isopropanol amine solution (50%) was added and mixed. 1020 g of completely demineralised water was then slowly added at 80° C. with thorough agitation. The mixture was homogenised for 3 hours.

FK: 35.3%

SZ: 17.7 mg KOH/g

MEQ-amine: 22.

EXAMPLE 10

246 g of methyl ethyl ketone, 49 g DMPA and 131 g IPDI were mixed and reacted at 60° C. until the NCO value was 4.4%. 475 g of polyester (high-molecular) and 608 g polyester (low-molecular) as per Example 6 and 361 g of MEK were added at 50° C. The reaction was continued at 60° C. until the NCO value was below 0.1%, the mixture was cooled to 50° C. and 33 g of IPDI with 1.3 g DBTL were added. The mixture was heated to 60° C., reacted until the NCO was less than 0.1% and 57 g dimethyl isopropanol amine (50%) were added at 50° C. The mixture was homogenised for 10 minutes, 2329 g water was added, and the MEK was later distilled off at about 85° C. in vacuo.

Solids: 38.6%

Acid number: 17.7 mg KOH/g

MEQ-amine: 19.7.

EXAMPLE 11

The components for producing a pre-adduct of 244 g N-methyl pyrrolidone, 1074 g methyl ethyl ketone, 186 g DMPA and 888 g IPDI were mixed and reacted at 60° C. until the NCO value was 4.4%. 3815 g of a commercial polyester as per Example 1 and 1021 g methyl ethyl ketone were added at 50° C. The reaction was continued at 60° C. until the NCO value was below 0.1%, followed by cooling to 50° C. and addition of 332 g IPDI with 5 g DBTL. After heating to 60° C. and further reaction until the NCO value was less than 0.1%, 215 dimethyl isopropanol amine (50%) was added at 50° C. The mixture was homogenised for 10 minutes, 8622 g completely demineralised water was added and the methyl ethyl ketone was later distilled off at 85° C. in vacuo.

FK: 36.8%

SZ: 17.6 mg KOH/g

MEQ-amine: 20.0.

EXAMPLE 12

127 g methyl ethyl ketone, 26 g DMPA and 101 g IPDI were mixed and reacted at 60° C. until the NCO value was 8.7%. 647 g of a commercial polyester (Mn=1730, OH number=65) and 131 g methyl ethyl ketone were added at 50° C. The reaction was continued at 60° C. until the NCO value was below 0.1%, re-cooled to 50%, and then 20 g IPDI and 10 g IPDI triisocyanurate were reacted with 0.8 g DBTL. The mixture was heated to 60° C., reacted until the NCO value was less than 0.1% and then mixed at 50° C. with 30 g of aqueous dimethyl isopropanol amine solution (50%). After agitation until homogeneous (10 min), the mixture was diluted with 1407 g completely demineralised water at 50° C. with thorough agitation. The methyl ethyl ketone was then distilled off at 90° C. Optionally a slight vacuum can be applied.

FK: 35.6%

SZ: 14.6 mg KOH/g

MEQ-amine: 18.7.

We claim:

1. A method for applying an aqueous coating agent to a substrate and curing it at temperatures of up to 150° C., wherein the aqueous coating agent is free of cross-linking agents and comprises a binder consisting of:

10–70 wt % of a polyurethane dispersion, and

90–30 wt % of a water-dilutable binder, and wherein said polyurethane dispersion is an aqueous dispersion of polyurethane resins free from urea groups and containing ionic groups and with a number average molecular weight (Mn) of 10,000 to 300,000 and an acid number of 5 to 50, obtained by preparing a polyurethane prepolymer containing OH groups and with an OH number of 5 to 75 and a number average molecular weight (Mn) of 5,000 to 50,000, by reacting the following in an organic medium:

A) One or more compounds which react with isocyanate and have an acid number of 0 to 10, in the form of a) 70 to 100 wt. % of one or more polyester diols and/or polyether diols with a molecular weight of 500 to 6,000, together with b) 30 to 0 wt. % of one or more compounds different from a) and with at least two groups which react with isocyanate and with a molecular weight of 60 to 400, with B) One or more substances containing free isocyanate groups and obtained by a reaction between c) At least one compound with two groups which react with isocyanate and with at least one anionic or anion-forming group and d) One or more organic diisocyanates in a proportion such that the molar ration of the groups reacting with isocyanate in c) to the isocyanate groups in d) is 1:1.5 to 1:2.5 the component B) being used in a proportion such that the final polyurethane resins have the desired acid number, and where component B) could be produced in the presence of component A), and with C) One or more polyisocyanates with at least two free isocyanate groups per molecule, in a proportion such that the molar ratio of the OH groups in component A) to the NCO groups in components B) and C) is 1.01:1 to 3:1, after which the prepolymer obtained from A), B), and C), before or after partial or complete neutralization of any groups present which are convertible into ionic groups, is subjected to a chain-lengthening process in the organic medium, by reaction with D) One or more polyfunctional isocyanates with a functionality of free NCO groups of at least 1.8, in proportions such that the final polyurethane resin has the desired number average molecular weight, and the resulting resin is converted in to the aqueous phase.

2. The method of claim 1 wherein component Ab) is a compound containing at least one blocked NCO group and two groups which react with isocyanate.

3. The method of claim 1 wherein component Bc) contains one or more free carboxyl groups.

4. The method of claim 1 wherein component B) is soluble in organic solvents.

5. The method of claim 1 wherein component C) contains a member of the groups consisting of aliphatic, cycloaliphatic, and sterically hindered isocyanates.

6. The method of claim 5 wherein a proportion of triisocyanates or polyisocyanates of up to 25 wt % relative to the solids in component C) is used.

7. The method of claim 1 used to apply multi-layer lacquer coats on motor vehicles and parts thereof.

8. The method of claim 7 wherein the priming layer or optional other layers are applied to a substrate and then a base layer is applied and then covered with a clear-lacquer layer.

9. The method of claim 8 wherein the clear-lacquer layer is produced from an aqueous clear lacquer.

10. The method of claim 1 wherein a priming layer or optionally other layers are applied to the substrate prior to applying said aqueous coating agent.

11. The method of claim 5 wherein said polyisocyanates of component C) are diisocyanates.

* * * * *